Patented Oct. 15, 1940

2,218,485

UNITED STATES PATENT OFFICE 2,218,485

REFRACTORY AND METHOD OF MAKING

Max Y. Seaton, Greenwich, Conn., and Hugh H. Hartzell, San Leandro, Calif., assignors to Westvaco Chlorine Products Corporation, New York, N. Y., a corporation of Delaware No Drawing. Application January 17, 1938, Serial No. 185,444

10 Claims. (Cl. 106—9)

This invention or discovery relates to refractories and methods of making; and it comprises, as a new granular refractory particularly adapted for patching basic open-hearth furnaces, a physical, partially reacted mixture of lime, sufficient magnesia to give a high ratio of MgO to CaO, and smaller amounts of alumina, silica, and sometimes iron oxide, the proportions being such that the granular mixture initially becomes plastic at furnace temperatures and remains so for a period sufficient to permit inter-granular welding or bonding into a dense mass, and then reacts further to form a monolithic mass of material wholly refractory at the temperature of molten iron; and it further comprises a method of making such a composition wherein a material comprising magnesia, alumina, silica and insufficient lime to form the desired final composition is fired, and another material comprising lime and usually further quantities of magnesia, silica, and alumina is separately fired, either or both of said materials sometimes containing iron oxide, and wherein the fired materials are graded to obtain them in the form of granules of the desired size, said granules being then mixed in suitable proportions, with or without admixture of a wetting agent such as granular basic open-hearth slag adapted to accelerate reaction between the granular materials at furnace temperatures; all as more fully hereinafter set forth and as claimed.

Basic refractories are used for many purposes but their major utilization is in basic open-hearth furnaces. Such furnaces consist essentially of a large dish or basin in which impure metallic iron is melted and refined to produce pure iron or steel. This dish or basin is confined by side walls and covered by a roof, both made of refractory material, and is provided with means for firing at both ends. The temperatures prevailing in the furnace during operation and between heats are very high; for example, the finished molten metal is usually tapped from the furnace at a temperature of around 3000° F. The temperatures of the combustion gases above the steel bath, and also, of course, of the refractory portions of the furnace exposed to the combustion gases, are ordinarily substantially higher than 3000° F.

The material employed for construction of the dish, hearth, or basin in which the steel is held must withstand exceedingly severe conditions. Not only are the temperatures encountered exceedingly high, but the surface of the basin (or open-hearth bottom as it is usually termed) must resist high static pressures due to the weight of the heavy molten metal. It must also resist the erosive action of the viscous liquid metal and of the solid iron and fluxes charged into the furnace, as well as the chemical action of the slags employed and formed in the refining process. These slags, particularly toward the end of the refining operation, are of a highly basic nature and it is therefore necessary that the material used in the open-hearth bottom be basic. The slag composition eliminates the possibility of using acid refractories—highly siliceous refractories, for example.

The material which is almost universally used for open-hearth furnace construction is magnesia, usually deadburned magnesite. Deadburned dolomite is sometimes used. The magnesia is a natural or synthetic product containing usually 80 to 85 per cent of MgO, the balance being made up of silica, iron oxide, lime, alumina and certain minor constituents. This material softens and becomes plastic at high temperatures, but does not actually fuse at the temperatures obtaining during normal furnace operation. It is supplied to the furnace in the form of a grain or granular material, which is spread on an underlying support of refractory brick and is sintered into a solid monolithic bottom or basin by long continued heating of successively spread thin layers.

Unfortunately, these magnesite open-hearth bottoms are not permanent under furnace operating conditions. Holes develop in the bottom itself, due to erosion and the mechanical action of gases evolved from the steel during refining and other causes. Even more serious than these holes in the bottom are the conditions that arise around the rim of the basin, especially at the slag line where the slag which floats on the molten steel contacts the monolithic magnesite structure and reacts with it. In an effort to prevent this destructive slag line attack, the slag line is frequently dressed with layers of granular raw dolomite, and eroded portions are patched or covered with granular deadburned magnesite or granular deadburned dolomite. The raw dolomite is intended primarily to avoid excessive attack of the basic bottom structure by acid slags during the early stage of the refining process, and the dressings of deadburned magnesite and dolomite are intended to sinter into firmly bonded material which will fill any holes that may have developed along the slag line.

It has long been recognized that these attempted repairs of the bottom and slag line of open-hearth furnaces are far from satisfactory. The material used for patching purposes must sinter readily to a solid mass, well bonded to the walls of the hole being repaired, or it will be floated out by the molten metal. This necessitates that the patching material have low refractoriness in order that it may be properly softened at furnace temperatures. However, once the patch is in place it must be and remain reasonably hard at furnace operating temperatures, as otherwise its rate of removal by erosion will be exceedingly high. This requires that the material must have high refractoriness. The two requirements are obviously in direct contradiction. Hearth temperatures cannot be raised substantially above normal operating temperatures, even during repair periods between heats, without doing substantial damage to the refractories from which the side walls and roof are constructed. As a compromise between the contradictory requirements indicated, a material is ordinarily used which will soften to a reasonable extent and thus bond in place, although not forming a completely solid patch, and which will possess moderate hardness at furnace operating temperatures, although it is admittedly too soft to completely resist the erosive influences encountered in operation. It is natural that such a compromise should at best be unsatisfactory, and that it should not make for low upkeep cost.

An ideal material for use under the exacting conditions indicated, would be one which behaves in the high temperature field (around 3000° F.) very much as certain phenol-formaldehyde plastics do at lower temperatures. These compounds initially have a low melting point and high fluidity, but they progressively become less and less fluid, as heating progresses, until they are finally transformed into solid infusible masses. Unfortunately, because of their organic nature, such materials cannot be used in furnace practice. Many attempts have been made, however, consciously or unconsciously, to obtain a similar result with refractory materials. For example, for a long time substantially the only materials used for basic open-hearths, both during the initial lining and as patching material, were certain grades of hand-picked rather impure Austrian and Grecian magnesites; portions of the native magnesite containing, centesimally, 10 to 14 per cent of iron oxide, alumina and silica taken together. In the hearth, the granules bond together at the temperature necessary for melting iron, but do not soften enough to float. The material however is not altogether satisfactory. Bonding occurs only between the surfaces of the granules, and the percentage composition of the whole granule is not a reliable index of the results. As substitutes for, or improvements on, this material, many dolomite preparations have been made: granular burnt dolomite, for example, being mixed with a little granular basic open-hearth slag, or being heated with such a slag, or being coated with various materials, etc.

Many synthetic preparations have also been proposed which could, it was stated, beneficially replace the foreign magnesites and other natural materials, having the virtues of such materials while being free of their uncertain and unreliable characteristics. For example, one of these preparations was made by firing to incipient vitrifaction a mixture of raw materials comprising magnesite to produce a deadburned product containing 16 to 18 per cent of lime, about 6 or 6.5 per cent of silica, 8 to 8.5 per cent of iron oxide and alumina taken together, and 67 to 70 per cent of magnesia. It is claimed that this material may be ground and used for lining furnaces and the like with good results. Upon exposure to temperatures slightly above the ordinary furnace operating temperatures, it is said that the material sets or binds without the addition of other materials, and the constituents then react or interact to form a much more refractory mass which is resistant to the action of molten metal, slags, etc.

We have found that a final refractory material of somewhat similar composition can be formed by a different procedure which results in greatly improved characteristics and uniformity of the product, and better control of the reactions involved. The new procedure involves a new application of certain chemical reactions which in themselves have been known heretofore.

It is known that magnesium orthosilicate, $(MgO)_2.SiO_2$, which is also known as forsterite, and calcium orthosilicate, $(CaO)_2.SiO_2$, are both exceedingly high melting and refractory substances when in a pure state. Any mixture of the two has a lower melting point, however, and the lowest melting point in the system is obtained with the equi-molecular mixture or compound having the theoretical formula $CaO.MgO.SiO_2$ or $Ca_2SiO_4.Mg_2SiO_4$, which is known as monticellite. We have found that when monticellite or other mixed silicates of lime and magnesia are heated with lime, the melting point steadily rises as the components react, as disclosed in another application. It appears that the lime and silica combine preferentially, displacing magnesia from the monticellite or other silicate; and the displaced magnesia appears as periclase, which is known to be even more refractory than the orthosilicates. It is therefore possible to heat a mixture of monticellite (with or without the presence of free magnesia or periclase) with lime, and to obtain a refractory mass consisting of periclase in a matrix of calcium orthosilicate. This material is strong and highly refractory, especially when the components are substantially pure, but the reaction of these pure ingredients requires extremely high temperatures and a very long time for completion.

In a way, the composition may be regarded as having one component, the monticellite, which becomes plastic and sticky at furnace temperature and another, the lime which is much more infusible; the two reacting to form something wholly refractory at these temperatures. There is a first temporary bond which becomes permanent; soft surfaces stick together and then the surfaces harden. Monticellite however requires rather a high temperature to produce the initial bond, and we have found that for patching purposes it is desirable to lower the temperature of plasticity somewhat by replacing some of the silica by alumina. Tricalcium aluminate and magnesium aluminate have properties analogous to the corresponding orthosilicates. With a certain amount of $Al_2O_3$ present, a patching refractory can be made which develops the initial temporary bond much more rapidly. Time is an element in patching.

We have found that the heat-hardening principles involved in the monticellite-lime reaction can be usefully employed with this modification in refractories for use as patching materials for open-hearth furnaces, and can be controlled to produce materials much more satisfactory than any heretofore known. For this purpose, a refractory material having as its principal component magnesium oxide in crystalline form (periclase) with a matrix consisting largely of monticellite, is heated with sufficient lime-containing material so that the lime will replace the magnesia in the monticellite. The reaction between the lime and monticellite is as follows:

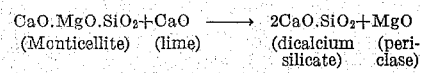

$$CaO.MgO.SiO_2 + CaO \longrightarrow 2CaO.SiO_2 + MgO$$
(Monticellite) (lime) (dicalcium silicate) (periclase)

Any aluminum oxide which is contained in the initial magnesium oxide refractory will exist there in the form of magnesium aluminate (spinel), which is also decomposed by lime to form tricalcium aluminate and periclase in accordance with the following reaction:

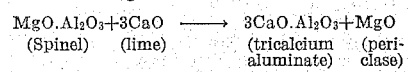

$$MgO.Al_2O_3 + 3CaO \longrightarrow 3CaO.Al_2O_3 + MgO$$
(Spinel) (lime) (tricalcium aluminate) (periclase)

It is clear that the chemical results of these two reactions are the transformation of a high magnesia refractory bonded with monticellite and magnesium aluminate to a refractory with a higher free magnesia content which is bonded with dicalcium silicate (calcium orthosilicate) and tricalcium aluminate. The physical results of this transformation are especially interesting. The initial refractory has a softening point of 2770° F. or lower (depending on the amount of alumina and iron oxide present) but the final material does not soften below 3000° F., and will, in fact, support a load of 20 pounds per square inch at temperatures up to approximately 3200° F. without showing a deformation of more than 1 per cent.

This transformation represents a true heat-hardening effect—that is, the refractoriness of the mixture becomes progressively greater as heating is continued. However, even the initial periclase-monticellite composition mentioned hereinabove is not directly suitable for use with lime in the repair and maintenance of open-hearth bottoms. Even with its relatively low refractoriness as compared with the final product, its softening point is somewhat too high to permit its being sintered into place without damage to the furnace structure. We have found that this composition can be modified to make it suitable without departing from the basic principles involved, by including certain ingredients in the original high magnesia material, and these ingredients may also be included in the lime-containing material which is reacted with the high magnesia material.

The addition of iron oxide to the extent of about 5 to 10 per cent causes some reduction in the softening or melting temperature of the magnesia-monticellite component, and results in a product having a somewhat wider range of plasticity, which is highly desirable in open-hearth bottom patching material. The most striking modification in the initial softening point can be effected, however, by the addition or inclusion of aluminum oxide which, with the desired high magnesia content, should be present to the extent of at least about 1 to 3 per cent. The inclusion of this amount of alumina reduces the softening temperature to a point at least 100° F. lower than that of the magnesia-monticellite component without alumina, and the softening point is thus brought well within the operating temperature limit of open-hearth furnaces. In fact, the resulting product will become quite soft and pasty at normal furnace temperatures.

The alumina is advantageously included in the high magnesia component, as previously noted, and this component is mixed, before use, with the high lime component which supplies the calcium oxide necessary for conversion of the monticellite and spinel into dicalcium silicate and tricalcium aluminate. Since the mixed material must generally be used and stored under conditions where relatively pure lime would slake and disintegrate, it is advantageous to use as the lime-containing component a product of the general class of "double burned" dolomites. These are dolomites calcined at high temperatures, to which iron oxide and other fluxes have been added. They may be obtained by the calcination of natural dolomites, or may be synthesized from relatively pure lime and relatively pure magnesia with the addition of the desired fluxes.

Both the high lime material and the high magnesia material should be reduced to the form of a grain or granular material of suitable size before mixing. For example, materials which will pass a ⅜ inch mesh screen and remain on a 10 mesh screen are satisfactory. After this grading, the two grains are mixed in such proportion that the desired chemical reactions can occur upon exposure to sufficiently elevated temperatures.

As a specific example of our invention, a high magnesia refractory component was prepared by deadburning precipitated magnesia (magnesium hydroxide) to which had been added silica and alumina and some lime, thereby producing periclase in a complex matrix of relatively low refractoriness, containing monticellite and spinel. This material was graded to size, and two parts by weight of this deadburned granulated synthetic magnesite were mixed with one part by weight of similarly sized, burned lime-containing material. In this particular case, the lime-containing material was a double burned synthetic dolomite, made by burning precipitated magnesia with oyster shell lime and containing about 6 per cent silica and 47 per cent lime. The following table shows the composition of the dead-burned magnesite (A), the double-burned dolomite (B), and the mixture (C), all quantities being expressed as per cent by weight:

|  | A | B | C |
| --- | --- | --- | --- |
| $SiO_2$ | 5.93 | 5.85 | 5.90 |
| $Fe_2O_3$ | 6.83 | 5.78 | 6.48 |
| $Al_2O_3$ | 2.92 | 0.65 | 2.16 |
| $CaO$ | 4.48 | 46.60 | 18.52 |
| $MgO$ | Balance | Balance | Balance |

The high magnesia component (A) of the mixture has such a low degree of refractoriness that it becomes soft and pasty at temperatures of the order of 2650° F., which normally exist in an open-hearth furnace during the repair period. However, as soon as the constituents of component (B) react with the constituents of component (A) so that the original monticellite and magnesium aluminate in the matrix or bond surrounding the periclase have been replaced by dicalcium silicate and calcium aluminate, the melting points rise sharply, and the resulting material easily supports loads of 20 pounds per square inch at temperatures of 3000° F. and above.

The silica content of the synthetic burned dolomite (B), in the above example, was adjusted to a rather high value (nearly 6 per cent) to make the dolomite less refractory and also to surround the CaO particles with a silicate layer to minimize slaking of the lime in contact with water or moisture in the air. The resulting mixture (C) can be stored for a considerable length of time without any substantial slaking taking place.

The granular mixtures, such as (C) in the above example, are in most respects ideal heat-hardening refractories for open-hearth maintenance. The only difficulty has to do with the rate of reaction between the two components to develop the desired heat-hardening effect. When a mixture of relatively coarse grains of components (A) and (B), for example, is used in an open-hearth furnace, the rate of reaction—or the initiation of the reaction—is relatively slow, presumably because the contact between the grains is not very intimate. A satisfactorily rapid rate can readily be obtained, even under these adverse conditions, if a third component which wets the surfaces of the grains is present. The component which we prefer to use for this purpose is normal, basic open-hearth slag.

The use of slag as the third or wetting component of our heat-hardening refractories is very simple and convenient. As a matter of fact, when a hole in the bottom of an open-hearth furnace is to be repaired there is nearly always enough of the slag present in the hole, in spite of the best draining technique which can be applied, to serve as a wetting medium for the grains of repair material which are placed in the hole. This is true for at least the initial layer of repair material. Under the influence of the wetting agent (the slag) reaction between the high magnesia component and the high lime component is greatly accelerated, and the desired heat-hardening effect appears within a few minutes.

In instances where slag is not naturally present in the portions of the furnace to be repaired—for example, on steep banks and in slag line repairs—granulated open-hearth slag can be added to the above-described mixture (C), for example, to the extent of about 10 to 20 per cent by weight. When this three-component mixture is introduced into the furnace, say on the slag line, the slag melts and promotes reaction between the other two components so that the real heat-hardening effect is soon observed.

In all cases, the refractoriness of the high magnesia component is low enough, and its proportion in the mix is high enough, so that before the heat-hardening commences or progresses to any material extent, the entire patch softens sufficiently so that it becomes of high density and forms a sound bond with the underlying surface. The desired monolithic structure of the furnace bottom, including the patch, is thus restored and preserved. However, the patch which is initially so soft and plastic that it would readily be floated out by the molten steel or seriously eroded by materials passing over its surface, becomes progressively harder as heating is continued and the above-described reactions proceed. As a result, the patch attains a degree of hardness adequate to withstand erosion, etc., before it is subjected to severe mechanical abuse. This takes place with sufficient rapidity to make patching in accordance with our invention a relatively economical procedure.

The advantages of a refractory of the above-described characteristics are obvious. Solid hard, well bonded patches can be obtained without raising furnace temperatures to a point where injury to furnace structure results. At the same time, the material initially charged to the furnace is so low in refractoriness that solid patch development is rapid and a minimum of delay is necessary for the patching procedure. Materials formulated in accordance with the general principles outlined hereinabove have been employed for a period of months in commercial open-hearth furnaces and have demonstrated their ability to perform in the manner indicated, and to effect a substantial reduction in the cost of refractories required for conducting such repairs.

Our invention has been described hereinabove with reference to certain embodiments thereof, and certain practices and raw materials employed therein, which are now considered advantageous, but it is to be understood that it may be otherwise embodied and practiced within the scope of the appended claims. For example, the high-magnesia component may have a magnesia content from about 65 per cent to about 90 per cent, and the range from about 75 to 85 per cent is particularly useful. The silica content need only be sufficient to form, in the matrix, monticellite or magnesium silicate amounting to about 5 to 20 per cent of the entire mass of this component, and can accordingly be from about 1.7 per cent to about 8 per cent. The $Fe_2O_3$ content affects the softening point, but is less effective for this purpose than alumina, and the amounts of iron occurring in the raw materials employed are generally satisfactory. These amounts frequently total 5 to 10 per cent, but may be as low as 1 per cent or less. The alumina content is preferably adjusted to about 1 to 3 per cent, depending on the softness desired, and may be as high as 4 or 5 per cent in some instances. The lime content of this component should not materially exceed the silica content, so that it cannot combine with the silica beyond the monticellite stage, and generally should not exceed about 3 to 6 per cent.

The composition of the high-lime component may be similarly varied. The silica content of this component is advantageously high enough to prevent slaking of the lime before use, and is therefore generally from about 4 to about 10 per cent. The iron and alumina contents of this component are not critical, and may be varied from about 1 per cent to about 10 per cent, and from about 0.5 per cent to about 3 per cent, respectively. The lime content of this component should be sufficient to convert all the silica and alumina, in both components into dicalcium silicate and tricalcium aluminate, respectively. Sufficient excess lime is generally supplied to also convert some or all of the iron oxide into calcium ferrite. This lime content may therefore vary from about 30 per cent to about 60 per cent, but is generally between 40 and 55 per cent. Magnesia, constituting the balance of this component, varies inversely with the lime content between about 30 per cent and about 50 per cent.

It is desirable to adjust the compositions of the two components, and the proportions in which they are combined, so that the final product will contain at least 60 per cent of magnesia, and preferably 65 per cent to 80 per cent, with about 5 to 20 per cent of dicalcium silicate and 3 to 10 per cent of tricalcium aluminate. There may also be present amounts of calcium ferrite or iron oxide or both totaling up to about 10 or 20 per cent.

We claim:

1. As a patching material for basic open-hearth furnaces, a physical mixture of two different basic refractory components in granular form, the first of said components having a major portion of magnesia and lesser quantities of silica, lime, and alumina which are present in such proportions that said component softens at temperatures between 2500° F. and 2800° F., and the second said component containing a smaller proportion of magnesia and sufficient lime to convert all the silica and alumina in both components into dicalcium silicate and tricalcium aluminate, respectively, by reactions which start at said temperatures.

2. The material of claim 1, wherein the first said component is the product of firing together materials comprising 65 to 90 per cent MgO, 1.7 to 9 per cent $SiO_2$, 1 to 5 per cent $Al_2O_3$, 2 to 6 per cent CaO, and up to 10 per cent $Fe_2O_3$.

3. The material of claim 1, wherein the said second component is a burned dolomite containing 30 to 60 per cent CaO, 3 to 10 per cent $SiO_2$, up to 3 per cent $Al_2O_3$, 30 to 60 per cent MgO, and up to 10 per cent $Fe_2O_3$.

4. The material of claim 1, wherein the said components are combined in such proportions that the final product of said reactions comprises 60 to 80 per cent MgO, 5 to 20 per cent calcium orthosilicate, and 3 to 10 per cent tricalcium aluminate.

5. The material of claim 1 with the addition of granular basic open-hearth furnace slag in quantities amounting to 10 to 20 per cent by weight.

6. As a heat-hardening basic refractory, a mixture of granules of a first component comprising a major portion of magnesia and lesser quantities of lime, silica, and alumina occuring in a matrix which softens at temperatures between 2500° and 2800° F., with granules of a second component comprising sufficient lime to react with all the silica and alumina in both components to form calcium orthosilicate and tricalcium aluminate, the two components being so proportioned that the product of their interaction is a refractory material comprising 60 to 80 per cent MgO and adapted to withstand loads of 20 pounds per square inch at temperatures above 3000° F.

7. The method of making a heat-hardening basic refractory material, which comprises making a burned magnesite having a softening temperature between 2500° F. and 2800° F. and containing about 65 to 90 per cent MgO, about 2 to 9 per cent $SiO_2$, about 1 to 4 per cent $Al_2O_3$, and about 2 to 6 per cent CaO, and grading it to obtain granules of the desired size, making burned dolomite lime containing 30 to 60 per cent CaO, 30 to 50 per cent MgO and 4 to 8 per cent $SiO_2$, and grading it to obtain granules of the desired size, and mixing said magnesite granules with a quantity of the said dolomite granules sufficient to supply CaO for the conversion of all silica and alumina present into calcium orthosilicate and tricalcium aluminate.

8. The method of claim 7, wherein the mixed granules of magnesite and dolomite are combined with 10 to 20 per cent by weight of granular basic open-hearth furnace slag.

9. The method of maintaining and repairing basic open-hearth furnace bottoms, which comprises supplying to said bottoms a mixture of two different materials in granular form, one of said materials containing 65 to 90 per cent MgO and smaller amounts of silica, alumina and lime in such proportions that the material softens at temperatures between 2500° and 2800° F., the other of said materials containing a smaller amount of MgO and sufficient CaO to convert all the silica and alumina in both components into calcium orthosilicate and tricalcium aluminate and to convert at least part of any iron oxide present into calcium ferrite, and subjecting the said mixture to normal furnace temperatures for a period sufficient to cause the first of said materials to soften and initiate reaction with the other material, thereby forming a refractory mass bonded to the adjacent portions of the furnace bottom and adapted to support loads of 20 pounds per square inch at temperatures exceeding 3000° F.

10. The method of claim 9, wherein 10 to 20 per cent of granular basic open-hearth slag is supplied to the furnace bottom with the said mixture.

MAX Y. SEATON.
HUGH H. HARTZELL.